INVENTOR:
Ernest Wildhaber

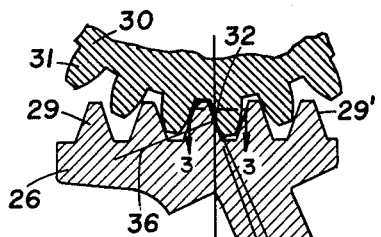
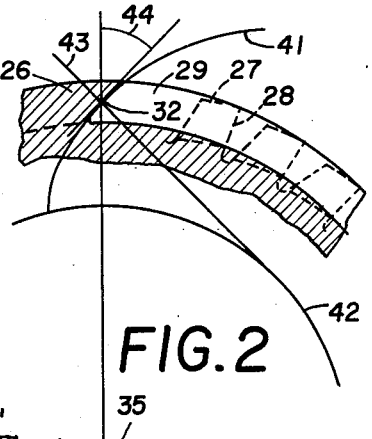
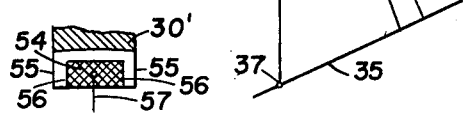
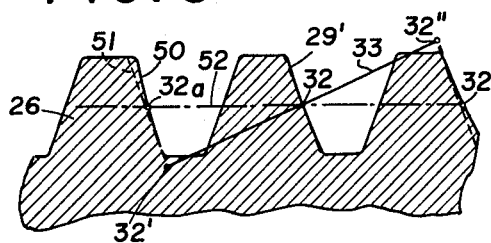
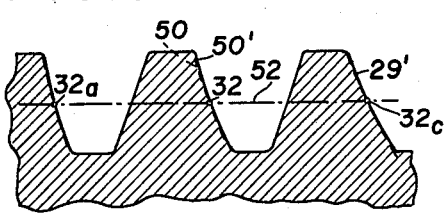
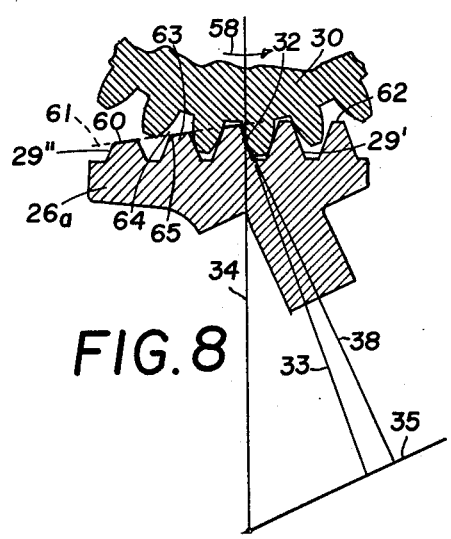
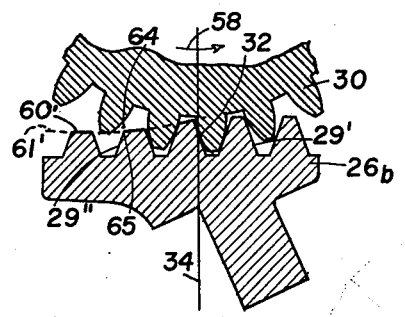

May 12, 1964 E. WILDHABER 3,132,411
HOB, AND METHOD AND MEANS FOR USING THE SAME
Filed Aug. 29, 1960 4 Sheets-Sheet 4

INVENTOR.
Ernest Wildhaber

United States Patent Office 3,132,411
Patented May 12, 1964

3,132,411
HOB, AND METHOD AND MEANS FOR USING THE SAME
Ernest Wildhaber, Brighton, N.Y.
(124 Summit Drive, Rochester 20, N.Y.)
Filed Aug. 29, 1960, Ser. No. 52,630
15 Claims. (Cl. 29—103)

The present invention relates to hobs of relatively large diameter for cutting the sides of straight and helical teeth arranged about an axis, without feed along said axis, and so as to sweep the entire tooth sides in a single bodily position of the hob, and to a method and means of using such hobs.

Although large hobs with the said characteristic have been proposed before, those proposed produced gear teeth somewhat thicker at their ends than at the middle. Their product was inferior and in general unacceptable as a finished product.

One object of the present invention is to devise a highly efficient hob capable of turning out a first-class finished product; and one capable of producing teeth from solid metal at a rate of one hob turn per tooth.

Generally crowned gear teeth are desired, that are very slightly thinner at their ends than at their middle. A further object is to provide a hob of the said character, that is capable of accomplishing this. Also a hob shall be devised that is capable of producing a fine finish.

Other objects are to provide a method and means for using the novel hobs to good advantage.

Further objects will appear in the course of the specification and in the recital of the appended claims. These objects may be attained singly and in any combination.

The present invention is related to the subject matter disclosed in my application "Threaded Rotary Member for Generating Spur and Helical Gear Teeth, and Method and Means for Using the Same" filed May 31, 1960, Serial No. 32,872, which relates particularly to grinding and brading. Reference is made to this application. In the drawings:

FIG. 1 is a fragmentary normal section through the thread of a hob constructed according to the present invention, and through gear teeth engaged thereby. This section practically coincides with an axial section on single-thread hobs.

FIG. 2 is a fragmentary section of the same hob thread taken at right angles to the hob axis, that is, in a plane containing hob radius 38, and a diagram explanatory of the invention.

FIG. 3 is a fragmentary longitudinal section, taken along line 3—3 of FIG. 1, of the hob thread shown in FIGS. 1 and 2, and of gear teeth engaged thereby.

FIG. 4 is an enlarged and fragmentary axial section of the basic thread shape of a hob as shown in FIGS. 1 to 3.

FIG. 5 is a similar enlarged and fragmentary axial section, showing a thread shape slightly modified as compared with that of FIG. 4 to produce tooth profiles eased off adjacent their ends.

FIG. 6 is a fragmentary axial section and peripheral view of a spur gear produced with a hob as described with FIGS. 1 to 4, showing the localized tooth bearing attainable therewith.

FIG. 7 is a fragmentary axial section and peripheral view of a helical gear produced with the same hob.

FIG. 8 is a normal section similar to FIG. 1, but showing a hob with a roughing portion, to cut teeth from a solid blank. For convenience the gear teeth are shown near their finished stage.

FIG. 9 is a section similar to FIG. 8, but illustrating a hob with a different roughing portion.

Figure 10:
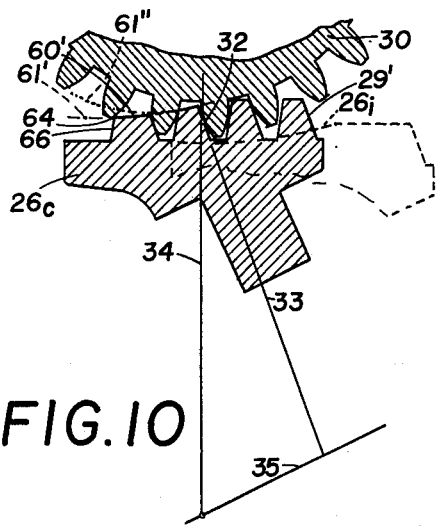
FIGS. 10 and 11 are also normal sections similar to FIG. 1, illustrating further modifications of the roughing portions.
Figure 11:
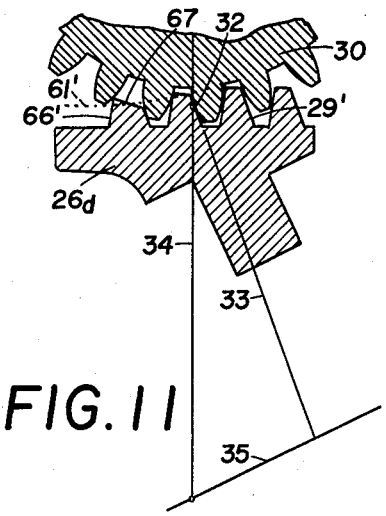

FIGS. 1 to 5 illustrate particularly the thread surface or cutting surface of a hob 26 constructed according to the present invention. Hob 26 is one of a pair of hobs used for cutting opposite tooth sides of a gear. As on other hobs, the cutting teeth 27 (FIG. 2) of the hob 26 are relieved to provide cutting clearance. The side surfaces of the cutting teeth do not lie in the cutting surface except for the cutting edges 28 themselves. They are moderately inclined to the cutting surface, to the side surfaces of the continuous hob thread 29.

A finished or nearly finished gear blank 30 (FIG. 1), with teeth 31, is shown in engagement with one side 29' of the hob thread. The mean point or pitch point 32 of the gear tooth profile is one point of contact. 33 denotes the common tangent of the gear profile and thread profile at said point 32. It coincides with the profile of the rack that is conjugate to the gear. The pitch vertical 34 passes through pitch point 32 and is perpendicular to the pitch surface of the gear 30 and radial of the gear axis. The hob axis 35 intersects the pitch vertical 34 at point 37 and includes an acute angle with said pitch vertical. This angle would be a right angle on cylindrical hobs. Surface 29' is at least approximately a helical surface extending about the hob axis at a constant axial lead.

The drawing plane of FIG. 1 contains the pitch vertical 34 and the tooth-surface normal 36 at point 32. On spur gears with straight teeth the drawing plane is perpendicular to the gear axis. On helical gears it is perpendicular to the helix passing through point 32. The hob axis 35 is slightly inclined to the drawing plane of FIG. 1 because of the inclination of the hob thread to the peripheral direction of the hob.

Hob radius 38 passes through point 32 and lies in a plane perpendicular to the hob axis 35. It includes a small angle 40 with the profile tangent 33, while the pitch vertical 34 includes an angle 40a therewith. It should be noted that the angles 40 and 40a are plotted to opposite sides from tangent 33. Whereas on cylindrical hobs the radial direction coincides with the pitch vertical 34 and profile tangent 33 appears to the right thereof, tangent 33 appears to the left of the radial direction 38 on the present hob. It may be said that the thread surface 29' has a negative inclination to the direction radial of the hob axis. This causes it to be slightly internal: The thread side 29' is concavely curved lengthwise, as shown with exaggeration in FIG. 3. Thus the hob 26 sweeps the entire length of the teeth 31 in a single bodily position.

FIG. 2 tells more about the hob thread, as applied to the production of involute gear teeth. It will be described first in its basic form, the form that produces true involute profiles on the gear teeth, without ease-off at the profile ends. This basic thread side 29′ is an involute helicoid. Its profile in a plane perpendicular to the hob axis 35 is an involute 41 of a base circle 42. It is shown extended in FIG. 2. The normal 43 is tangent to the base circle 42 and coincides with the projected surface normal of the involute helicoid. This helicoid has a constant lead and contains straight-line elements which in the axial view (FIG. 2) appear to coincide with the surface normals like normal 43. They are equally offset from the hob axis 35 and equally inclined thereto. Because of the negative inclination 40 the involute profile 41 is internal and concavely curved. The profile inclination 44 or transverse pressure angle is preferably made at least thirty degrees, or larger. A zero inclination angle 44 would result in a base circle passing through pitch point 32. It would give very sharply curved profiles and would exclude conjugate action between the hob thread and the gear teeth anywhere to the inside of point 32. This condition is safely kept away from with the present invention.

FIG. 4 illustrates an axial section of the described basic hob thread, showing the sectional profile 50 of the considered thread side. Profile 50 is slightly concave, but much less so than the involute profile 41 of the transverse section. The dotted straight lines 51 show the rack profile. The rack profile is tangent to profile 50 at pitch point 32 and at all points 32′, 32″ of a straight line 33 parallel to the hob axis and passing through point 32. The points 32′, 32, 32″ are uniformly spaced.

The profiles 50 of different convolutions of the hob thread are seen to have slightly differing profile inclinations at their mean points 32a, 32, 32c which lie on the pitch surface 52 of the hob.

To produce tooth profiles that are eased off at their ends, hob profiles 50′ (FIG. 5) are provided that are more concave than the profiles 50 shown in dotted lines in FIG. 5. Profiles 50 are identical with those of FIG. 4. The superimposed profiles 50 and 50′ contact at their mean profile points 32a, 32, 32c etc. Their inclination to the depthwise direction of the hob thread decreases with increasing hob radius. The cutting surface of the modified hob is tangent to the basic involute helicoid approximately along the pitch surface of the hob and is more concavely curved profilewise than said involute helicoid.

The continuous thread side 29′, in which the cutting edges lie, may be produced with a tool that is fed in a plane parallel to the hob axis and tangent to the base circle 42. It is fed in a direction following the taper of the hob, that is approximately along the pitch surface of the hob. This feed is in direct proportion to the turning motion of the hob on its axis. The opposite thread side does not get into finishing contact and may be produced with sufficient clearance in any suitable known way. The hob is relieved so that on one side the cutting edges lie in said thread side 29′.

A hob may be built in one piece if desired. Or it is split up into segments, as is customary on gear cutters of larger diameter.

FIG. 6 illustrates the effect of tooth crowning as achieved on a spur gear 30′ with a hob of the present invention. The produced teeth are slightly convex lengthwise, so that the area 54 swept by the tooth contact in a given running position is kept away from the tooth ends 55. The shown shape of area 54 is produced by a basic hob thread, such as described with FIG. 4. The ends 56 of area 54 generally follow the mean tooth surface normal 57 as seen in this peripheral view. When profile-wise crowning is added the tooth bearing area becomes oval (not shown).

FIG. 7 shows the tooth bearing area 54′ attained with the same hob on a helical gear. The ends 56′ also approximately follow the projected mean tooth surface normal 57′, which is here inclined to the tooth ends 55.

It is also possible to achieve tooth-bearing areas with square ends that follow the tooth ends 55 (FIG. 7), and tooth-bearing areas with other inclinations, by departing slightly from the exact helical nature of the thread surface.

Preferably the gear teeth are cut from solid blanks to their final shape in one operation. This operation comprises a first phase of advancing the hob relatively to a gear blank to full-depth cutting position. It occupies only a few hob turns. The bulk of the teeth are cut to full depth from solid stock in the second phase. It takes one turn of a single-thread hob per gear tooth. The second phase may or may not be followed by a third phase, in which the teeth are gone over again to produce the best possible finish and accuracy.

On fine-pitch gear teeth hobs with multiple threads may be used in preference to hobs drastically decreased in diameter. Then the number of hob turns is correspondingly reduced.

The process requires taper hobs of relatively large diameters, preferably at least twenty times larger than the working depth of the teeth produced. Such hobs have generally at least twenty cutting teeth per thread convolution, and usually more.

The Roughing Portion

FIGS. 8 to 11 show different forms of roughing portions that may be provided on my hob. They are numbered in the order of increased preference. They show the respective hob in engagement with a gear 30 that is already cut to full depth, and that turns in the direction of arrow 58 in the cutting operation.

One object of a special roughing portion is to provide end-cutting edges 60 (FIG. 8) of increased width, that are capable of taking substantial cuts. In their finishing portions 29′ the hobs 26a, 26b, 26c, 26d of FIGS. 8 to 11 are like hob 26 described with FIGS. 1 to 5. Hob 26a (FIG. 8) contains end-cutting edges 60 that lie in a conical surface of straight axial profile 61. This surface is coaxial with the hob. Profile 61 is differently inclined to the hob axis 35 than the profile of the outside surface 62 of the full-depth portion of the hob. The outside cutting surface of the roughing portion has a different general taper than that of the finishing portion. This applies also to the hobs 26b, 26c, 26d.

When the outside cutting surface of the roughing portion has a straight profile 61 the thread portions 63 move depthwise into the engaged tooth space of the gear blank 30 at a speed increasing with increasing distance from pitch point 32, in cutting. Thus the thread portion bearing the numeral 63 moves in depthwise at a faster rate than the thread portion immediately adjacent pitch point 32, as the hob and gear rotate together, so that the end chip produced by its edge 60 is thicker than that produced by edge 60 of said other thread portion. In other words, the end chips produced by the different edges 60 have quite different thicknesses.

The hob design 26b of FIG. 9 accomplishes end chips of more nearly equal thickness. Here the end-cutting edges 60′ lie in a tapered surface of revolution of concavely curved profile 61′ in an axial section. The more profile 61′ follows the gear circumference, the smaller is the depthwise displacement of the edges 60′ per given turning angle of the hob. While the inclination of profile 61 (FIG. 8) to the peripheral direction of the engaged gear varies much along its length, the profile 61′ has less variation and gives chips that vary less in thickness. The hob design 26b avoids premature hob wear at the edges 60′ that operate at the largest distance from pitch point 32. Hob wear is kept down by spreading it more evenly.

In both embodiments, FIG. 8 and FIG. 9, both sides of the thread or threads are at least approximately helical surfaces of constant lead. There is an appreciable gap at 64 between the gear teeth to be produced and the hob thread, where the hob thread enters a tooth space. As a result part of the stock is removed by the side-cutting edges of the thread side 29″. The corner or juncture 65 of the end-cutting edge and side-cutting edge is the projecting portion most exposed to wear, even when well rounded.

The modified hob 26c shown in FIG. 10 minimizes this exposure. Here the thread side 66 opposite to side 29′ is not a helical surface of constant lead, but a surface of changing lead determined to maintain contact with the engaged gear-tooth side to be rough cut. Here there is no appreciable gap at 64, so that practically all the stock is removed by the end-cutting edges 60′. These are the same edges as on hob 26b of FIG. 9, except for width. They occupy larger portions of profile 61′. Now that the side 66 has practically ceased to cut, the corners at 64 are less exposed and are capable of standing up better.

Dotted lines 61″ indicate a modified outside profile of the roughing portion, to spread the roughing region further if desired.

Removal of the stock with the end-cutting edges alone represents the most efficient and the most favorable way of stock removal and chip flow.

While on the hobs 26a, 26b, 26c, FIGS. 8 to 10, the end-cutting edges lie in a surface of revolution, the end-cutting edges 67 of hob 26d (FIG. 11) are differently positioned. They follow the tapered surface of revolution coaxial with the hob axis and having a profile 61′, the same profile as used on the hobs 26b, 26c. The centers of the cutting edges 67 lie on said surface of revolution, but the edges 67 themselves are inclined to said surface in a direction so that they are less inclined to the peripheral direction of the engaged tooth spaces than said surface of revolution. With this disposition full-width roughing chips are attained right from the start, in the aforesaid phase two of the process.

The determination of the thread side 66 of hob 26c and of thread side 66′ of hob 26d will now be described. It is known how a thread surface with axis 35 can be determined that meshes with the tooth sides of a given gear 30. One way to do so is to describe the tooth surfaces of the gear with a reciprocating cutter that has the shape of that spur gear or helical gear, and by engaging it with a blank of the shape of the hob, while turning the gear represented by the cutter and the blank on their respective axes, as if the hob would mesh and run with the gear.

What we need of said generated thread surface is its intersection line with the given outside thread surface of the roughing part of the hob. In the case of hob 26c it is the intersection line of the generated thread surface with the surface of revolution that contains profile 61′ and is coaxial with the hob. The sought thread side 66 or 66′ is a surface that contains the said intersection line and that has a straight profile of constant inclination with respect to the hob axis. This profile may intersect the hob axis or have a constant distance therefrom. In other words, the sought thread side is a helical surface of varying lead. It can be determined from the known intersection line. It may also be computed.

The profile inclination of the thread sides 66, 66′ to the direction of the pitch vertical 34 is preferably kept smaller than the inclination of the profile tangent 33 thereto, as shown.

Hob Disposition and Hobbing Method

Figure 12:
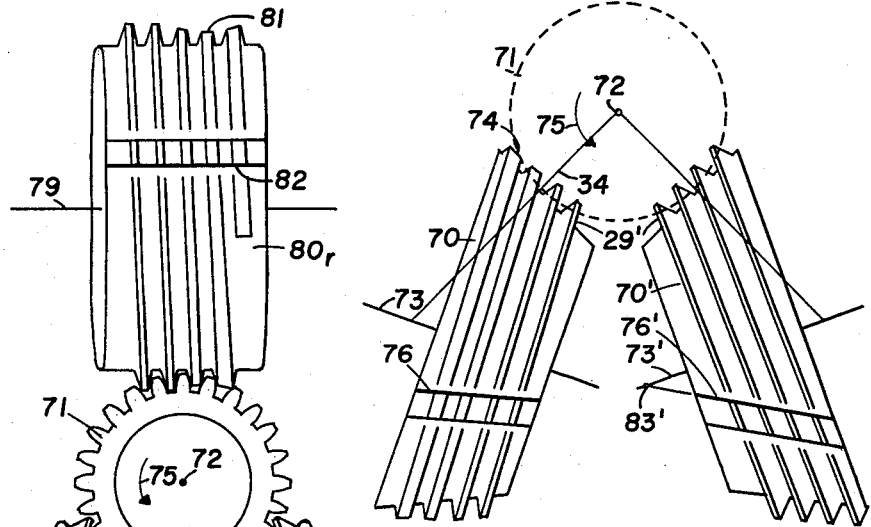
FIG. 12 is a diagram showing one disposition of a pair of hobs with respect to a gear blank, looking in the direction of the blank axis. The hobs are shown in positions with their axes in a common plane, before they are set angularly to match the tooth direction of the gear blank.

FIG. 12 illustrates a disposition with two taper hobs 70, 70′ acting on a gear blank 71 with axis 72. The axes 73, 73′ of the hobs and their pitch verticals 34 are at an angle to each other, respectively. The hobs are shown with their axes in the drawing plane, before they are set about the respective pitch verticals to their lead angle. The two hobs 70, 70′ are adapted to finish opposite sides of the gear teeth with identical thread sides 29′, as described. Hob 70 contains roughing portions 74 like those described, to cut the teeth of the gear blank 71 to full depth as it turns on its axis 72 in the direction of arrow 75. The hob thread is split up into cutting teeth by gashes whose one sides provides a cutting face.

While I may use the conventional plane cutting face that coincides with an axial plane of the hob, I preferably use plane cutting faces that are differently positioned, to provide better cutting angles. Thus I may use on hob 70 cutting faces like face 76, whose plane is inclined to the hob axis and which is shown in a position perpendicular to the drawing plane. The cutting faces are equally spaced about the hob axis. Faces 76 provide front rake for the end cutting edges and some side rake for the cutting edges of side 29′.

The opposite hob 70′ operates on an already roughed gear blank and may be provided with plane cutting faces such as face 76′ that gives more side rake on the cutting edges of side 29′. Cutting faces like face 76 of hob 70 could also be used if desired.

In the first phase of the hobbing operation the hobs are advanced to full-depth position relatively to the gear blank. In one procedure the rotating hobs are fed radially along the respective pitch vertical 34 towards the rotating gear blank 71 during several turns of the hobs. Hob 70 may be fed first, and hob 70′ later when the tooth spaces roughed out by hob 70 come within reach of hob 70′.

To avoid adding to the chip load during the advance of the hobs I may use a modified procedure, as will now be described with FIG. 10. The hob is fed tangentially against the rotating gear blank as well as radially towards the gear axis. It is fed from the dotted position 26i of its outline to the position 26c shown in full lines. At zero feed rate the hob and gear blank are timed so that the gear turns through one pitch per turn of the single-thread hob. When the hob is fed against the gear rotation the gear blank is slowed down, to retain the proper timing. The gear blank comes to a stand-still when the tangential feed component of the hob equals the turning speed of the gear at zero feed rate. Then the hob screws itself into a stationary gear, and additional cutting load through gear rotation is avoided. After full cutting depth is reached the cutting process takes place as described, and the opposite tooth sides are generated by the sides 29′ of the threads of the two hobs 70, 70′ (FIG. 12).

If the two single-thread hobs 70, 70′ are fed to full depth simultaneously, it takes one hob turn per tooth of the gear blank to cut the teeth to full depth, plus the few hob turns used in the depth feed. Hob 70′ is then preferably also provided with roughing portions. When hob 70′ is fed to full depth after hob 70, then an additional number of hob turns is required.

A gear further improved in accuracy and finish may be obtained by going over the tooth sides a second time in the same continuous operation, taking a very light cut. In this case the hobs are advanced slightly towards the respective tooth sides which they are to finish, preferably by changing their timing rather than by a bodily hob displacement. Because of the many hob cutting edges and the side rake provided a very fine finish is attainable in this way, so that is unnecessary to add a shaving operation.

Figure 13:
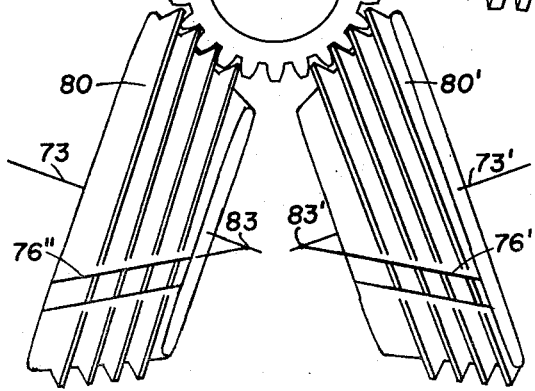
FIG. 13 is a diagram similar to FIG. 12, with the hobs set for cutting straight spur teeth, illustrating a modification wherein a roughing hob and a pair of finishing hobs are used.

A modified arrangement is illustrated in FIG. 13. Here three hobs 80r, 80, 80′ are used to cut the teeth of gear blank 71. Hob 80r is a cylindrical hob that serves for roughing exclusively. It contains roughing portions 81 of changing depth and full-depth thread portions. Its cutting faces 82, are preferably planes parallel to and offset from the hob axis 79.

The two finishing hobs 80, 80′ contain plane cutting faces 76″, 76′ and identical hob threads. Hob 80′ may be identical with hob 70′ shown in FIG. 12. Hob 80 differs from hob 80′ only in the opposite position of its cutting faces 76″. The planes of the cutting faces intersect the respective hob axes 73, 73′ at points 83, 83′ equally distant from the respective hob body.

The cutting faces (76″, 76′) have a constant inclination to the respective hob axis during the hob life. And their intersection point 83, 83′ with the hob axis is preferably maintained at a constant distance from the hob body. The hob thread is relieved with this requirement in view, so that the cutting edges formed by said plane cutting faces on the hob teeth lie on the given continuous hob-thread surface.

With the described three-hob arrangement the diameter and number of gashes of the roughing hob and of the finishing hobs are independent of each other and may be determined for the desired effect.

In operation the rotating roughing hob 80r is first advanced to full-depth position and then roughs out the teeth of the gear blank 71 which turns in the direction of arrow 75. Preferably the two hobs 80, 80′ are moved into operative position only after all the teeth have been roughed out. They then finish opposite tooth sides simultaneously.

To cut helical gear teeth, each hob is angularly adjusted about its pitch vertical 34 to an angle made up in known manner of the lead angle of the hob and of the helix angle of the gear teeth, so that the direction of the hob thread matches the direction of the tooth helix at the pitch point 32.

Machine

A machine using two hobs in accordance with diagram FIG. 12 will now be described with FIG. 14.

The work spindle and axis 72 of the gear blank 71 are vertical. The two taper hobs 70, 70′ have spacer disks 84 interposed between them and their spindles 85, 85′, so that the axial hob position can be moderately changed. The spindles 85, 85′ are each rotatably mounted on a swivel head 86, 86′ which is angularly adjustable on a slide 87, 87′ about a horizontal axis radial of axis 72. This adjustment axis coincides with the pitch vertical 34. The adjustment axes of the two swivel heads 86, 86′ are angularly disposed to one another and intersect on the axis 72 of the work spindle.

For simplicity automatic control means, and means for adjusting and for securing in adjusted position are omitted in the drawing.

The said slide 87, 87′ is adjustable on the machine frame towards and away from the work spindle in the direction of the adjustment axis of said swivel head.

A timing train connects the hob spindles with the work spindle or work carrier. It includes a shaft 88, 88′ coaxial with said adjustment axis. Each hob spindle 85, 85′ is rotated by a hypoid gear 90 and pinion 91 indicated in dotted lines. The pinion shaft 89, 89′ is parallel to the aforesaid adjustment axis and to said shaft 88, 88′ that is coaxial therewith, and is connected with said shaft through a pair of cylindrical gears 92a, 92. While straight teeth have been shown on the gears for convenience, helical or spiral teeth are preferably used. The hub of gear 92 is rotatably mounted in an axially fixed position on said slide 87, 87′, while the respective shaft 88, 88′ is splined or keyed to said hub and is axially slidable therein.

Each hob may be driven individually, if desired, as by an electric motor (not shown) that turns a vertical shaft with axis 93. This shaft drives the pinion shaft 89, 89′ through a pair of bevel gears 94, indicated in dotted lines. The larger member of this pair is rigid with cylindrical gear 92a.

The shafts 88, 88′ are connected with a pair of coaxial shaft members 95, 95′ by means of bevel gear pairs 96, 96′ respectively. Ordinarily the two hobs 70, 70′ turn equally on their axes, and the coaxial shaft members 95, 95′ also turn equally, as if they were rigid with each other. Member 95 comprises a short shaft portion and a long sleeve portion rigid therewith. A helical gear 97 is rigidly secured thereto. Member 95′ comprises a long shaft portion reaching into and journalled in the said sleeve portion. A helical gear 97′ is rigidly secured to said long shaft portion. The gears 97, 97′ have helical teeth of opposite hand. They are engaged respectively by two sets of matching internal teeth 98, 98′ of an outer sleeve member 99 that is built up of three parts rigidly secured to each other. Sleeve member 99 controls the relative turning position of the two coaxial shaft members 95, 95′.

When sleeve member 99 is shifted axially, the shaft members 95, 95′ are turned relative to each other, while the sleeve member has the average turning motion. It is operatively connected with the work spindle. It contains also a set 98″ of internal straight teeth that engage a wide faced spur gear 100 coaxial therewith. Spur gear 100 is rigidly connected to the hub of a bevel gear 101 that is rotatably mounted in an axially fixed position. Bevel gear 101 meshes with another bevel gear 102 whose shaft 103 is inclined to the horizontal drawing plane. At its opposite end shaft 103 contains a worm (not shown) that meshes with a wormgear 104 indicated in dotted lines. Wormgear 104 is coaxial with the work spindle and transmits motion thereto.

To change the turning position of the two hobs equally in opposite directions, for instance to advance the finishing thread sides of the hobs towards the opposite tooth sides they are to finish, the sleeve member 99 is shifted axially. Its axial position is controlled by a bearing 105 whose inner and outer races are axially fixed to sleeve member 99 and to a sleeve 106 respectively. Sleeve 106 is formed integral with a nut that engages a stationary external thread 107 rigidly secured to a part 108 projecting upwardly from the machine frame. On its outside the sleeve 106 contains helical teeth that are engaged by the thread of a worm 110 with vertical axis. When the worm is turned by hand or mechanically it also turns sleeve 106. As the sleeve 106 turns it moves axially along the thread 107. Sleeve member 99 follows sleeve 106 axially and changes the hob timing.

Figures 14, 15, 16, 17:
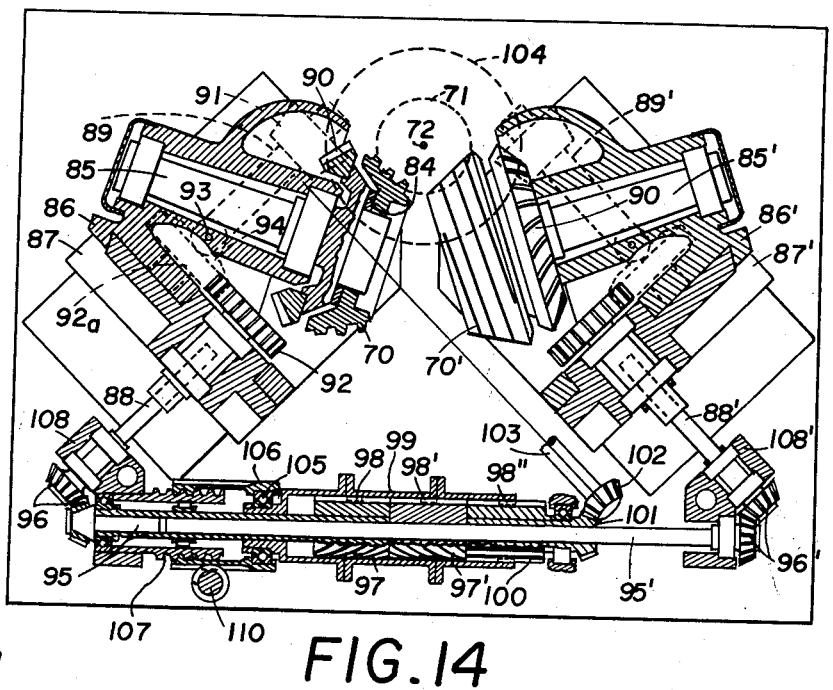
FIG. 14 is a plan view and horizontal section showing the drive arrangement in a machine embodying the disposition illustrated in FIG. 12, looking along the axis of the work support.
FIG. 15 is a fragmentary plan view illustrating a modified hob drive in a machine otherwise corresponding to FIG. 14.
FIG. 16 is a similar plan view illustrating a further modification.
FIG. 17 is a diagrammatic and fragmentary view taken along the hob axis and corresponding to FIG. 16.
Figure 18:
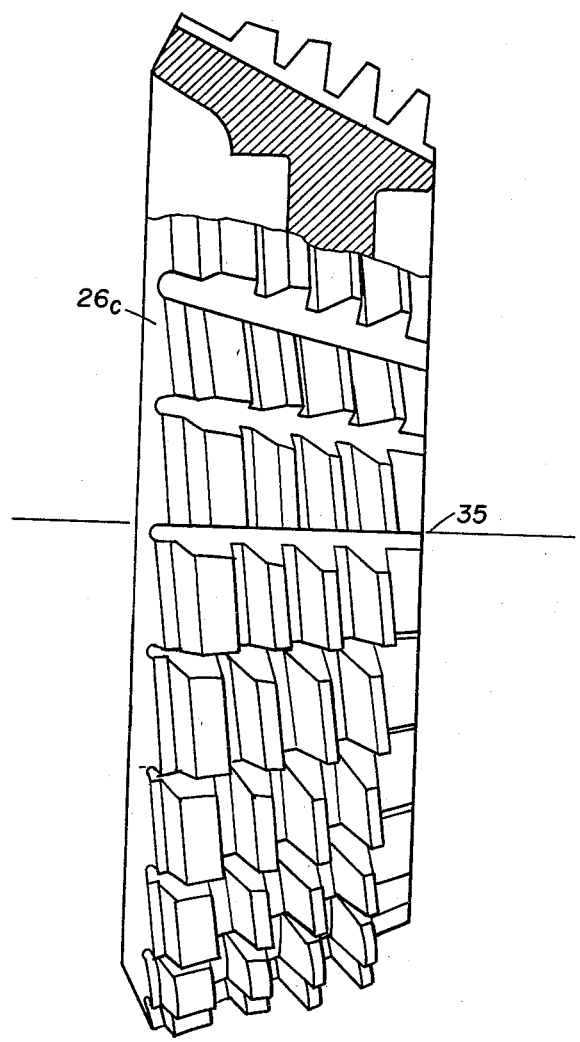
FIG. 18 is a part side view, part axial section of the hob of FIG. 1, when provided with cutting faces extending along axial planes.

FIG. 15 illustrates a modified form of hob drive. A bevel pinion 120 with straight or preferably spiral teeth is rotatably mounted coaxially with the axis 34 about which the swivel head 86 is adjustable. It meshes with a slightly internal bevel gear 121 that is coaxial with the hob spindle. Such a drive may be used especially for relatively small gear sizes, where the cutting loads are moderate. With large loads it is generally preferred to apply the driving tooth load close to the spot where the cutting load is applied to the workpiece.

FIGS. 16 and 17 illustrate a further hob-drive modification. Here the final drive is applied by a cylindrical pinion 130 that meshes with a cylindrical gear 131. Pinion 130 is connected with a miter gear 132 coaxial with the adjustment axis 34 and forming part of the timing train. The connection is through shaft 133, a pair of angular hypoid gears 134, shaft 135 and a miter gear 136 that meshes with miter gear 132.

The described hobs are suited to cut straight and helical tooth surfaces on segments or sectors, as well as on full gears. Also they can cut straight teeth arranged at a taper, where opposite tooth sides are helicoids of opposite hand, as for instance on Fellows-type gear-shaper cutters.

While the invention has been described in connection with several different embodiments thereof it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A taper hob for cutting straight and helical gear teeth so as to sweep the entire extent of the tooth sides in a single bodily position, said hob containing cutting teeth arranged in a thread and occupying a thread length in axial section smaller than the outside radius of the hob at the small end of the hob, said cutting teeth having side-cutting edges lying in a cutting surface that is basically a helical surface of constant lead coaxial with said hob, said surface having a negative inclination to the direction radial of the axis of the hob so that it is concavely curved lengthwise.

2. A taper hob according to claim 1, wherein said cutting surface is basically an involute helicoid that contains straight-line elements equally offset from the hob axis and equally inclined thereto.

3. A taper hob according to claim 1, wherein said cutting surface is basically an involute helicoid, and wherein the basic involute helicoid is modified to produce tooth profiles eased off adjacent their ends, the cutting surface being tangent to said involute helicoid approximately along the pitch surface of the hob and being more concavely curved profilewise than said involute helicoid.

4. A taper hob according to claim 1, wherein said cutting surface contains at least twenty cutting edges per thread convolution, and whose outside diameter is at least twenty times larger than the working depth of the teeth produced by the hob.

5. A taper hob according to claim 1, having a roughing portion of varying depth and a tapered full-depth portion, said roughing portion having a different general taper on its outside than said full-depth portion.

6. A hob for cutting straight and helical gear teeth without feed along the gear axis, containing rough-cutting teeth whose end-cutting edges follow a surface of revolution of concave profile, said rough-cutting teeth having a varying depth.

7. A hob according to claim 6, wherein said end-cutting edges not only follow said surface of revolution but lie in said same surface of revolution of concave profile.

8. A hob according to claim 6, wherein said end-cutting edges are inclined to said surface of revolution which they follow, and are less inclined to the peripheral direction of the engaged tooth spaces than the profile of said surface of revolution.

9. A taper hob for cutting straight and helical tooth sides on cylindrical gears, said hob containing cutting edges disposed in a thread, one side of said thread having a negative inclination to the direction radial of the hob axis so as to be concavely curved lengthwise, said hob being gashed to form cutting teeth and having finish-cutting teeth with finish-cutting edges on said one side and further having roughing teeth, said roughing teeth containing end-cutting edges adapted to rough-cut, said end-cutting edges following a surface of revolution of concave profile in an axial section on at least part of the hob, the end edges of the finish cutting teeth following a different surface of revolution.

10. A taper hob for cutting straight and helical gear teeth in solid cylindrical blanks, containing side-cutting edges and end-cutting edges disposed in a thread, one side of said thread being basically a helical surface of constant lead, the opposite side of said thread differing from a helical surface of constant lead so as to increase the width of the end cutting edges adjacent one end of the hob so that said end-cutting edges remove a larger proportion of the total removed stock than those of a hob thread with helical surfaces of constant lead on both sides.

11. A hob according to claim 10, wherein said opposite side of the thread is a helical surface of varying lead and of approximately straight profile, said surface having a smaller inclination to the depthwise direction of the hob thread than the thread side of constant lead.

12. A hob according to claim 10, that is tapered on its outside, and wherein said opposite thread side is shaped to approximately close said gap, so that the outside end edges of the hob do the depth roughing.

13. A taper hob for cutting straight and helical gear teeth in solid blanks, containing side-cutting edges and end-cutting edges disposed in a thread, said thread having an outside surface that is concavely curved at least adjacent one end of the hob, one side of said thread being basically a helical surface of constant lead, the opposite side thereof differing from helical surfaces of constant lead and being shaped to give a wider thread at the outside surface adjacent said one end of the hob than a helical thread side of constant lead.

14. A taper hob having cutting teeth arranged in a thread, cutting edges being formed on said cutting teeth by cutting faces that are unequally inclined to opposite sides of the thread and that extend diagonally across the hob face at an acute angle to one side of said thread, to produce keen cutting edges on said one side, each of said cutting faces being a plane inclined to the hob axis.

15. A taper hob according to claim 14, wherein the several plane cutting faces of the hob intersect the hob axis at a common point when extended, and wherein said common point has a constant position with respect to the hob body at all stages of the hob life.

References Cited in the file of this patent

UNITED STATES PATENTS

| | | |
|---|---|---|
| Re. 16,172 | Trbojevich | Sept. 22, 1925 |
| 1,454,135 | Olson | May 8, 1923 |
| 1,543,031 | Short | June 23, 1925 |
| 1,903,043 | Head | Mar. 28, 1933 |
| 2,037,930 | Schicht | Apr. 21, 1936 |
| 2,108,244 | Wildhaber | Feb. 15, 1938 |
| 2,512,241 | Bradner | June 20, 1950 |
| 2,916,803 | Wildhaber | Dec. 15, 1959 |